Aug. 20, 1935.     O. SINANIDE     2,011,831

VACUUM APPARATUS FOR MEDICAL TREATMENT AND OTHER PURPOSES

Filed July 12, 1933     2 Sheets-Sheet 1

Inventor:

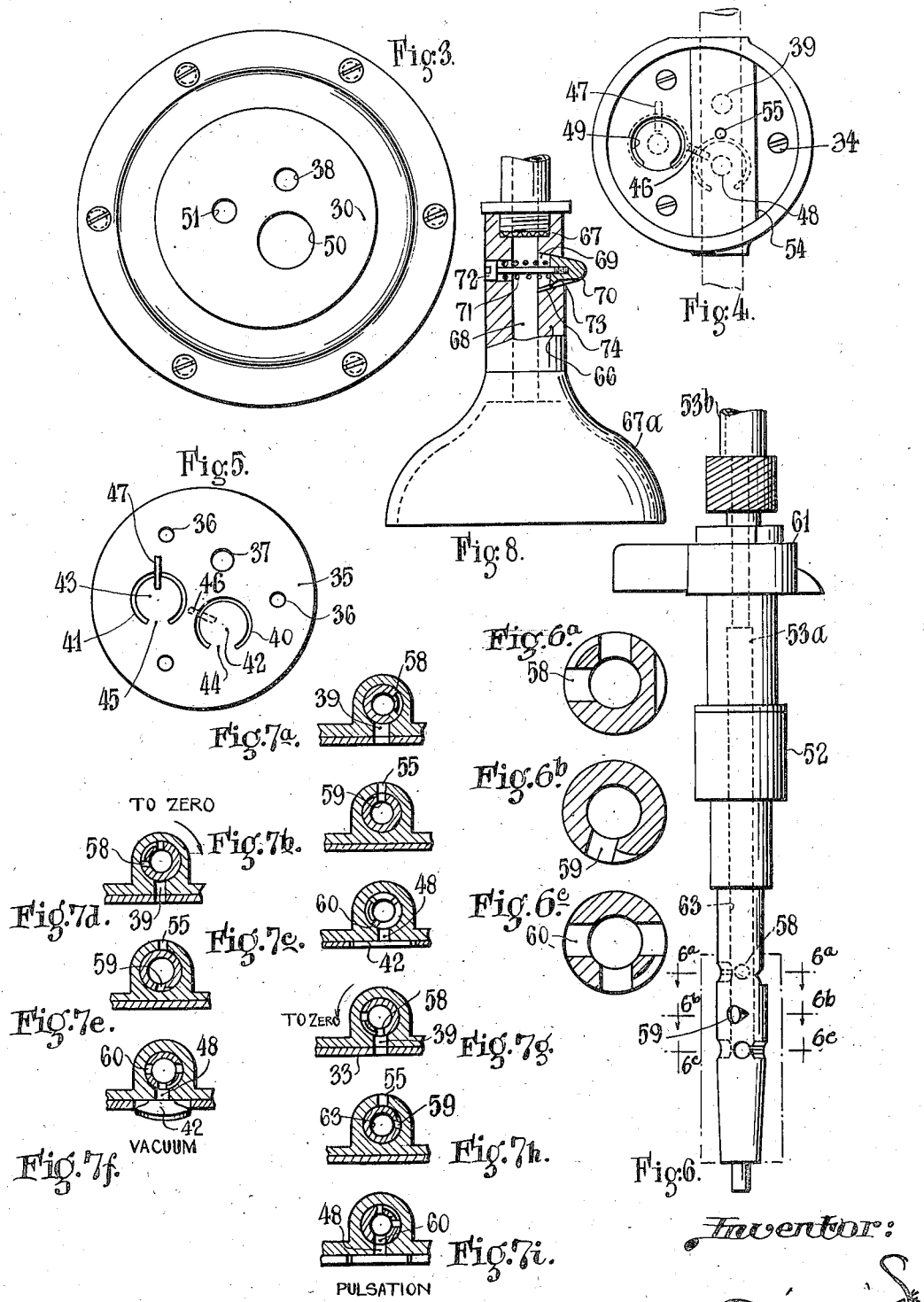

Patented Aug. 20, 1935

2,011,831

UNITED STATES PATENT OFFICE 2,011,831

VACUUM APPARATUS FOR MEDICAL TREATMENT AND OTHER PURPOSES

Oreste Sinanide, London, England

Application July 12, 1933, Serial No. 680,114
In Great Britain July 27, 1932

14 Claims. (Cl. 230—40)

This invention relates to vacuum apparatus of the type comprising an air pump with a piston, preferably one in which the piston is replaced by a diaphragm secured at its periphery, adapted to create at will a continuous vacuum or a series of pulsations in the same piping system connected to various utilization apparatus. It has for its object an improved vacuum apparatus of this type, particularly suitable for the kind of medical treatment consisting either in a continuous suction or in a rhythmic pulsation, adapted to provide an increase and stimulation of the general circulation in the body.

According to this invention I provide an apparatus of the type described, in combination with a system of passages and valves adapted to be brought into operation by means of the rotation of a suitable distribution tap, so that the change from the production of a steady vacuum to the production of pulsations as well as the regulation of the amount of vacuum and of the intensity or amplitude of the pulsations is obtained by the mere turning of the distribution tap between two extreme positions, one corresponding to the greatest vacuum and the other to the most violent pulsations obtainable.

Referring to the drawings, which illustrate as an example the construction of a vacuum apparatus according to this invention:—

Fig. 3 is an end view of the valve face on the head of the piston chamber.

Fig. 4 is an end elevation of the casing of the distributing tap.

Fig. 5 is a view of the valve-plate, the face shown being that juxtaposed to the valve face of the distributing tap.

Fig. 6 shows the distributing tap.

Figs. 6a, 6b and 6c are cross sections of the distribution tap at 6a—6a, 6b—6b, 6c—6c, of Fig. 6, respectively.

Figure 2:
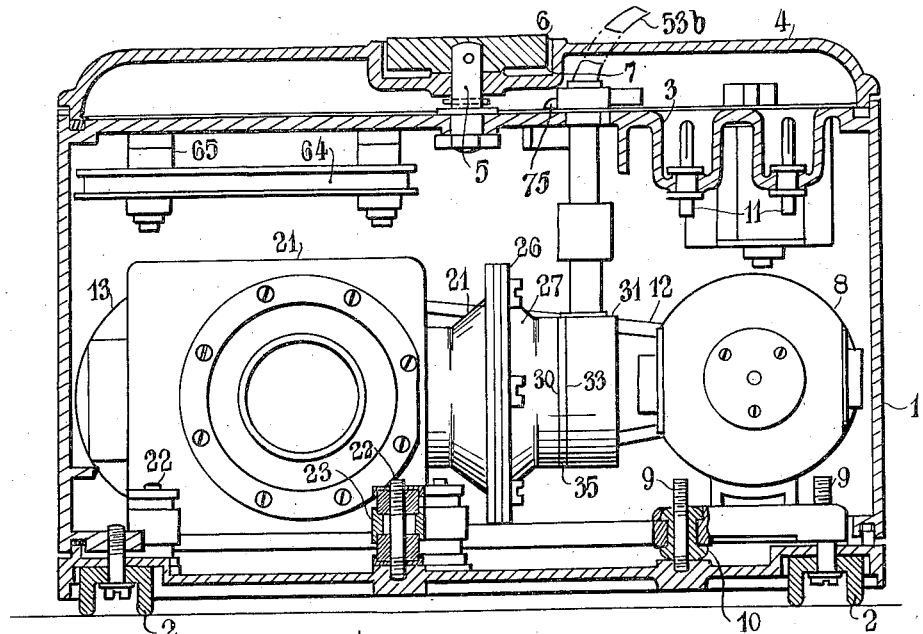
Fig. 2 is a side elevation, in part section.

Figs. 7a to 7i, show in sections, in its three principal positions the distribution tap shown in Fig. 6, respectively, Figs. 7a, 7b and 7c illustrating the position of each port in the said distribution tap when in the "neutral" position, that is, when the tap is open to the atmosphere, Figs. 7d, 7e and 7f illustrating the position of the said ports when the distribution tap is so placed that the pump is creating a vacuum, and Figs. 7g, 7h and 7i illustrating the position of the said ports when the tap is so placed that the pump is creating pulsations.

Fig. 8 is a view in part section of the valve member for releasing the vacuum during or at the end of the treatment.

The apparatus is enclosed in a casing 1 supported by India rubber shoes 2 and the top face 3 of which can be covered by a cover 4, adapted to be secured centrally of the casing by a catch 5, of the bayonet interrupted thread or other type, manipulated by the handle 6, sunk in a recess 7 at the top of the cover.

In the casing are disposed an electric motor 8, secured by bolts 9 to the base of the casing, against which it is fixed by means of India rubber shoes 10, so as to deaden the vibrations. Plugs 11 are provided at the top of the casing for connecting the motor to any suitable source of current, battery of accumulators or electric mains. The electric motor drives, by means of a belt 12 and a grooved pulley 13, the shaft 14 of a pinion 15 gearing with a crank-disc 16 on which is pivoted a return connecting rod 17 pivoted at 18 to the piston rod 19 adapted to reciprocate in the guiding bush 20. The casing 21 enclosing the reciprocating parts is secured to the base of the outer casing by means of bolts 22 and India rubber shoes 23, and it is dished at 24 and provided with a flange 25 against which fits the corresponding flange 26 of a dished cover 27, secured to the dished end 24 by peripheral bolts. Between the dished end and the dished cover is tightly clamped a diaphragm 28 of India rubber, leather or like material, secured at the middle to the end of the piston rod 19 by means of suitable clamping screws 29. The dished end and cover assembled in this manner constitute an air-tight circular chamber 62 in which reciprocates the diaphragm 28. The outer face of the cover has a smooth plane face 30, in which are provided three air ports, disposed in the manner described hereafter in connection with Fig. 3. A cylindrical housing 31 for the distribution tap 32, having a smooth plane face 33 with three corresponding air ports, is adapted to be secured by bolts 34 to the cover 27.

Figure 1:
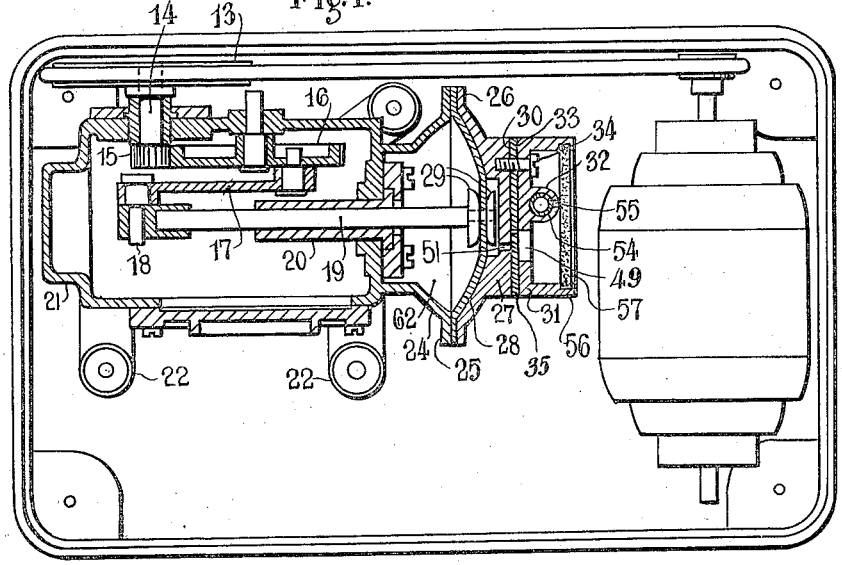
Fig. 1 is a plan, in part section, of the whole apparatus.

Between the two faces 30 and 33 of this cover and of the housing 31 is disposed a disc of flexible material 35, such as India rubber, leather, or thin metal sheet, such as steel, of the shape shown in Fig. 5, in which the sheet is seen as it is in position against the face 30. This disc 35 is provided with apertures 36 for the passage of the bolts 34 and with an aperture 37 corresponding to the apertures 38 and 39 of the faces 30 and 33 respectively, and two horse shoe shaped slots 40 and 41 forming flaps 42 and 43 held to the body of the disc by portions 44 and 45 forming hinges. Short resilient metal strips 46 and 47 acting as stops are cemented to the body of the disc, as shown, across the slots, one on one face of the disc and the other on the other face, as shown, so that the flaps 42 and 43 constitute valves, opening in opposite directions, the flap 42 into passages 48 and 50 and the flap 45 into passages 49 and 51 on the faces 33 and 39 respectively. This latter flap is seen in Fig. 1, where the slot separating it from the rest of the disc 35 is visible, but this figure is not intended to show clearly these details. When the disc 35 is made of thin resilient metal, such as steel, the metal strips 46 and 47 are dispensed with.

It will be observed (Figs. 3 and 4) that the apertures 48 and 50 are not of the same size, one being smaller than the flap 42 while the other one is larger, the smaller aperture 48 acts as a seat for the flap, while the larger aperture 50 allows it to lift; the arrangement constitutes therefore an air valve. Similarly the arrangement of apertures 49 and 51 and flap 43 constitutes another air valve working in the opposite direction to the first.

The distribution tap consists of a cylindrical or slightly tapering tube 52, (Fig. 6) closed at one end and fitting into the bore of a barrel 54, preferably cast in one with the body of the housing 31, and through the wall of which the apertures 39, 48 extend. This barrel is also provided with a further aperture 55. The wall of the housing 31 is provided on its internal periphery with a groove 56 in which fits the edge of a circular pad 57 of filtering material, which may be made antiseptic.

The tap 52 properly so called is provided with three systems of holes 58, 59, 60 one of each of which corresponds to one of the apertures 39, 55 and 48 respectively, and the arrangement of which is shown. The open end 53a is adapted to receive a key 61 by means of which the tap may be rotated on either side of a middle position referred to hereafter as the zero position, the position of the tap at any time being indicated by a pointer 75 on a circular scale marked "Vacuum—Zero—Pulsation". The open end of the tap is connected, by means of a flexible tube 53b and the release valve member shown in Fig. 8 and described hereafter, to a cup 61a of suitable shape adapted to be applied to any desired part of the human body against which it is desired to produce a partial vacuum, whether permanent or pulsating.

The operation of the distribution tap will be clear from Figs. 7a to 7i, which shows the middle and extreme positions of the tap when the apparatus functions in the various manners to which it is adapted.

When the pointer is at "zero", the tap is in the intermediate position shown at 7a, 7b and 7c, all passages being closed except 59, which is open to the atmosphere.

When the valve is rotated to the position 7d, 7e and 7f and the pointer is at "vacuum", all passages are again closed except the passage 48, the air is sucked by the membrane-piston through this passage and valve 42 opens to let it pass and closes to prevent it from re-entering the tube, and is forced out through the valve 43, the apparatus acting like an air pump pumping the air from the bore of the tap and the tube connected thereto.

If the valve is rotated from "zero", in the opposite direction, to the position 7g, 7h and 7i and the pointer is at "pulsation", the passage 59 is closed, the passages 58 allow the bore 63 of the tap to communicate with the portion of the chamber 62 enclosed between the diaphragm 28 and the dished cover 27. The passages 60 likewise allow the bore of the tap to communicate with the chamber 62 through the valve 42, which helps the suction of the air, the latter returning to the tube by the passage 58 when the return stroke of the piston takes place, the valve 42 having closed.

Grooves, ending at the opening of the passages 58, 59 and 60, are provided along a portion of the periphery of the tap 52, to render the action of the tap gradual.

The release valve member consists in a short length of metal tubing 66, forming a handle, adapted to be screwed on the end of the flexible tube, with the interposition of a filtering pad 67 if desired, and to receive a cup at its other or free end. The bore 68 of this member communicates with the outer air by means of a tapering passage 69 normally closed by a conical plug 70 pressed against its seat by a helical spring 71 held in position by the pin 72. The plug is provided with a groove 73 which, when the plug is pressed in by the finger, communicates with a groove 74 provided along the tapering passage 69 and allows air to enter into the bore 68, thereby relieving the vacuum inside the cup screwed onto the member 66.

Rheostats 64 are secured to supports 65 inside the casing to allow the speed of the motor to be varied as may be desired. Instead of a belt drive, a flexible coupling may advantageously be used.

The apparatus so constructed is compact and convenient to use, it provides a wide range of difference of pressure with the atmosphere from zero to a steady difference of at least 73 cm. of mercury or to a pulsation of variable frequency from normal pressure to the fullest vacuum obtainable. As a vacuum pump, it may be used for any purposes in which a vacuum is required, e. g., for filtering liquids under reduced pressure.

What I claim and desire to secure by Letters Patent is:—

1. In a vacuum apparatus, an electric driven reciprocating air pump the piston of which is constituted by a diaphragm, fixed at its periphery to the wall of a circular chamber, and, approximately at its centre, to the end of the piston rod of the said pump, an inlet pipe connected to the said pump a cover adapted to close the said circular chamber, three openings in the said cover, namely, an air inlet, an air outlet, an alternative inlet and outlet, an outwardly opening valve on the air outlet, an inwardly opening valve on the air inlet, a cylindrical housing one circular flat face of which is provided with three openings adapted to correspond to the three openings in the said cover, and communicating the air outlet with the outer air and the other two openings with a bore formed in the said housing, at two different places along the said bore, and a single rotatable distribution tap in the said bore, adapted to put the air inlet to the diaphragm chamber, or the alternative inlet and outlet, in communication with said inlet pipe.

2. A vacuum apparatus as claimed in claim 1 in which the rotatable distribution tap consists of a tubular member, provided with passages at three places along its length, said tubular member being adapted to rotate in a bore formed in a casing open to the atmosphere, said casing being itself secured to the head of the piston chamber.

3. A vacuum apparatus as claimed in claim 1 in which the rotatable distribution tap consists of a tubular member, provided with passages at three places along its length, with peripheral grooves for obtaining a gradual opening of the corresponding passages, said tubular member being adapted to rotate in a bore formed in a casing open to the atmosphere, said casing being itself secured to the head of the piston chamber.

4. A vacuum apparatus as claimed in claim 1 in which the rotatable distribution tap consists of a cylindrical tubular member, provided with passages at three places along its length, said tubular member being adapted to rotate in a bore formed in a casing open to the atmosphere, said casing being itself secured to the head of the piston chamber.

5. A vacuum apparatus as claimed in claim 1 in which the rotatable distribution tap consists of a tubular member, provided with passages at three places along its length, said tubular member being adapted to rotate in a bore formed in a barrel cast in one piece with a casing open to the atmosphere, said casing being itself secured to the head of the piston chamber.

6. A vacuum apparatus as claimed in claim 1 in which the rotatable distribution tap consists of a tubular member, provided with passages at three places along its length, said tubular member being adapted to rotate in a bore formed in a casing open to the atmosphere, said casing being itself secured to the head of the piston chamber, there being a set of three passages in the said head of the piston chamber, and a set of three passages in the said casing, both sets of passages opening, respectively, at faces on the said head and on the said casing, adapted to be juxtaposed so that the said passages mutually correspond, two of the said passages containing air valves opening in opposite directions, the passage containing the valve opening away from the piston opening directly into the said casing, and the two other passages opening into the said bore in the said casing.

7. A vacuum apparatus as claimed in claim 1 in which the rotatable distribution tap consists of a tubular member, provided with passages at three places along its length, said tubular member being adapted to rotate in a bore formed in a casing open to the atmosphere, said casing being itself secured to the head of the piston chamber, there being a set of three passages in the said head of the piston chamber, and a set of three passages in the said casing, both sets of passages opening, respectively, at faces on the said head and on the casing, adapted to be juxtaposed so that the said passages mutually correspond, two of the said passages containing air valves opening in opposite directions, the passage containing the valve opening away from the piston opening directly into the said casing, and the two other passages opening into the said bore in the said casing, the air valves being constituted by a disc of flexible material interposed between the face of the head of the piston chamber and the face of the casing, said disc being provided with two cuts, in such a way that portions of this disc form the flaps of the two air valves.

8. A vacuum apparatus as claimed in claim 1 in which the rotatable distribution tap consists of a tubular member, provided with passages at three places along its length, said tubular member being adapted to rotate in a bore formed in a casing open to the atmosphere, said casing being itself secured to the head of the piston chamber, there being a set of three passages in the said head of the piston chamber, and a set of three passages in the said casing, both sets of passages opening, respectively, at faces on the said head and on the casing, adapted to be juxtaposed so that the said passages mutually correspond, two of the said passages containing air valves opening in opposite directions, the passage containing the valve opening away from the piston opening directly into the said casing, and the two other passages opening into the said bore in the said casing, the air valves being constituted by a disc of thin resilient sheet metal interposed between the face of the head of the piston chamber and the face of the casing, said disc being provided with two cuts, in such a way that portions of this disc form the flaps of the two air valves.

9. A vacuum apparatus as claimed in claim 1 in which the rotatable distribution tap consists of a tubular member, provided with passages at three places along its length, said tubular member being adapted to rotate in a bore formed in a casing open to the atmosphere, said casing being itself secured to the head of the piston chamber, there being a set of three passages in the said head of the piston chamber, and a set of three passages in the said casing, both sets of passages opening, respectively, at faces on the said head and on the casing, adapted to be juxtaposed so that the said passages mutually correspond, two of the said passages containing air valves opening in opposite directions, the passage containing the valve opening away from the piston opening directly into the said casing, and the two other passages opening into the said bore in the said casing, the air valves being constituted by a disc of flexible material interposed between the face of the head of the piston chamber and the face of the casing, said disc being provided with two cuts, in such a way that portions of this disc form the flaps of the two air valves, the lift of said flaps being limited by a thin strip of rigid material secured across the cuts in the flexible material constituting the said disc, on alternate sides of the said disc.

10. A vacuum apparatus as claimed in claim 1 in which the rotatable distribution tap consists of a tubular member, provided with passages at three places along its length, said tubular member being adapted to rotate in a bore formed in a casing open to the atmosphere, said casing being itself secured to the head of the piston chamber, there being a set of three passages in the said head of the piston chamber, and a set of three passages in the said casing, both sets of passages opening, respectively, at faces on the said head and on the said casing, adapted to be juxtaposed so that the said passages mutually correspond, two of the said passages containing air valves opening in opposite directions, the passage containing the valve opening away from the piston opening directly in the said casing, and the two other passages opening into the said bore in the said casing, the air valves being constituted by a disc of flexible material interposed between the face of the head of the piston chamber and the face of the casing, said disc being provided with two slits in the shape of a horse shoe so as to form the flaps of two air valves, the hinges of which are the portions left uncut between the tips of the branches of the horse shoe cuts, said air valves being adapted to seat, one on the orifice of a corresponding passage in the face of the head of the piston chamber and the other on the orifice of a corresponding passage in the face of the casing of the rotary distribution tap, so as to open in opposite directions.

11. A vacuum apparatus as claimed in claim 1 in which the rotatable distribution tap consists of a tubular member, provided with passages at three places along its length, said tubular member being adapted to rotate in a bore formed in a casing open to the atmosphere, said casing being itself secured to the head of the piston chamber, each system of passages in the tubular member corresponding to a passage in the wall of said barrel, one of which passages opens into the casing, that is, to the atmosphere, another passage corresponds to the passage from the piston chamber in which there is no valve and the third passage corresponds to the passage from the piston chamber in which is an air valve the flap of which lifts away from the said piston chamber, the passage in which the other air valve is situated being open to the atmosphere.

12. In a vacuum apparatus, the combination of an electric motor, an air pump constituted by a diaphragm fixed at its periphery to the wall of the piston chamber, and approximately at its centre to the piston rod of the said pump, and a rotatable distribution tap consisting of a tubular member adapted to rotate in a bore formed in a casing secured to the head of the piston chamber and open to the atmosphere, the bore of which tubular member communicates, by means of openings at three places along its length, adapted to correspond with passages provided in the wall of said bore, with the piston chamber either directly or by means of an outwardly opening non-return valve, or else with the atmosphere, depending on the position of the said tubular member.

13. In a vacuum apparatus, the combination of an electric motor, an air pump constituted by a diaphragm fixed at its periphery to the wall of the piston chamber, and approximately at its centre to the piston rod of the said pump, and a rotatable distribution tap consisting of a tubular member adapted to rotate in a bore formed in a casing secured to the head of the piston chamber and open to the atmosphere, the bore of which tubular member communicates, by means of openings at three places along its length, adapted to correspond with passages provided in the wall of said bore, with the piston chamber either directly or by means of an outwardly opening non-return valve, or else with the atmosphere, depending on the position of the said tubular member, there being a set of three passages in the said head of the piston chamber, and a set of three passages in the said casing, both sets of passages opening, respectively, at faces on the said head and on the said casing, adapted to be juxtaposed so that the said passages mutually correspond, two of the said passages containing air valves opening in opposite directions, the passage containing the valve opening away from the piston opening directly into the said casing, and the two other passages opening into the said bore in the said casing.

14. In a vacuum apparatus, the combination of an electric motor, an air pump constituted by a diaphragm fixed at its periphery to the wall of the piston chamber, and approximately at its centre to the piston rod of the said pump, and a rotatable distribution tap consisting of a tubular member adapted to rotate in a bore formed in a casing secured to the head of the piston chamber and open to the atmosphere, the bore of which tubular member communicates, by means of openings at three places along its length, adapted to correspond with passages provided in the wall of said bore, with the piston chamber either directly or by means of an outwardly opening non-return valve, or else with the atmosphere, depending on the position of the said tubular member, there being a set of three passages in the said head of the piston chamber, and a set of three passages in the said casing, both sets of passages opening, respectively, at faces on the said head and on the said casing, adapted to be juxtaposed so that the said passages mutually correspond, two of the said passages containing air valves opening in opposite directions, the passage containing the valve opening away from the piston opening directly into the said casing, and the two other passages opening into the said bore in the said casing, the air valves being constituted by a disc of flexible material interposed between the face of the head of the piston chamber and the face of the casing.

ORESTE SINANIDE.